(12) United States Patent
Reginald Clarke

(10) Patent No.: US 9,694,531 B2
(45) Date of Patent: Jul. 4, 2017

(54) PREFORMS FOR BLOW MOULDING

(75) Inventor: Peter Reginald Clarke, West Sussex (GB)

(73) Assignee: GR8 ENGINEERING LIMITED, Chichester (GB)

( * ) Notice: Subject to any disclaimer, the term of this patent is extended or adjusted under 35 U.S.C. 154(b) by 112 days.

(21) Appl. No.: 13/996,316

(22) PCT Filed: Dec. 20, 2011

(86) PCT No.: PCT/EP2011/073467
§ 371 (c)(1),
(2), (4) Date: Aug. 8, 2013

(87) PCT Pub. No.: WO2012/084995
PCT Pub. Date: Jun. 28, 2012

(65) Prior Publication Data
US 2014/0295119 A1    Oct. 2, 2014

(30) Foreign Application Priority Data
Dec. 20, 2010    (GB) .................................. 1021529.1

(51) Int. Cl.
*B29C 49/00* (2006.01)
*B29C 49/02* (2006.01)
(Continued)

(52) U.S. Cl.
CPC .......... *B29C 49/0073* (2013.01); *B29B 11/14* (2013.01); *B29C 49/02* (2013.01);
(Continued)

(58) Field of Classification Search
CPC ..... B29B 11/14; B29C 49/0073; B29C 49/02; B29C 2049/2008; Y10T 428/1397;
(Continued)

(56) References Cited

U.S. PATENT DOCUMENTS 3,594,463 A    7/1971    Hestehave
4,977,005 A *  12/1990   Krishnakumar et al. .. 428/36.92
(Continued)

FOREIGN PATENT DOCUMENTS

DE    10234037           2/2004
EM    EP0029639 A1 *    6/1981    ............. B26D 23/03
(Continued)

OTHER PUBLICATIONS

International Preliminary Report and Written Opinion.

*Primary Examiner* — Lee E Sanderson
(74) *Attorney, Agent, or Firm* — Tarter Krinsky & Drogin LLP

(57) ABSTRACT

A preform for blow moulding to form a container, the preform being formed of a thermoplastic material, the preform comprising a neck finish at an open end of the preform, an elongate body section and a closed end, wherein the body section has elongate, longitudinally extending inner and outer surfaces each centered about a longitudinal axis of the preform, the inner and outer surfaces defining therebetween a wall of the body section, wherein the wall of the body section has at least one locally thickened portion along the body section, the locally thickened portion being thicker than adjacent first and second thinner portions at respective opposite longitudinal ends of the thickened portion, the thickened portion having an inner surface portion which is nearer to the longitudinal axis than respective first and second inner surface portions of the first and second thinner portions.

19 Claims, 2 Drawing Sheets

(51) Int. Cl.
*B29B 11/14* (2006.01)
*B29C 49/06* (2006.01)
*B29C 49/42* (2006.01)
*B29B 11/08* (2006.01)
*B29B 11/12* (2006.01)
*B29C 33/76* (2006.01)
*B29K 67/00* (2006.01)

(52) U.S. Cl.
CPC .......... *B29C 49/06* (2013.01); *B29C 49/4205* (2013.01); *B29B 11/08* (2013.01); *B29B 11/12* (2013.01); *B29B 2911/1402* (2013.01); *B29B 2911/1404* (2013.01); *B29B 2911/14026* (2013.01); *B29B 2911/14033* (2013.01); *B29B 2911/1434* (2013.01); *B29B 2911/1444* (2013.01); *B29B 2911/1448* (2013.01); *B29B 2911/1456* (2013.01); *B29B 2911/1482* (2013.01); *B29B 2911/14106* (2013.01); *B29B 2911/14133* (2013.01); *B29B 2911/14213* (2013.01); *B29B 2911/14326* (2013.01); *B29B 2911/14333* (2013.01); *B29B 2911/14373* (2013.01); *B29B 2911/14633* (2013.01); *B29C 33/76* (2013.01); *B29C 2049/0089* (2013.01); *B29K 2067/003* (2013.01); *Y10T 428/1397* (2015.01)

(58) Field of Classification Search
CPC .... B65D 2501/0018; B65D 2501/0027; B65D 2501/0045
USPC ....... 428/34.1, 34.2, 35.7, 35.9, 36.9, 36.91, 428/36.92
See application file for complete search history.

(56) References Cited

U.S. PATENT DOCUMENTS

| | | | |
|---|---|---|---|
| 4,981,736 | A | 1/1991 | Feddersen et al. |
| 5,047,271 | A * | 9/1991 | Feddersen et al. ........ 428/36.92 |
| 2004/0142128 | A1 | 7/2004 | Shmagin et al. |
| 2009/0220809 | A1 | 9/2009 | Bertheol et al. |
| 2011/0206882 | A1* | 8/2011 | Broyles et al. ............ 428/36.92 |
| 2013/0134124 | A1* | 5/2013 | Rashid et al. ................ 215/379 |

FOREIGN PATENT DOCUMENTS

| | | |
|---|---|---|
| EP | 0029639 | 6/1981 |
| EP | 0445465 | 9/1991 |
| EP | 2002240136 | 8/2002 |
| FR | 2898294 | 3/2006 |

* cited by examiner

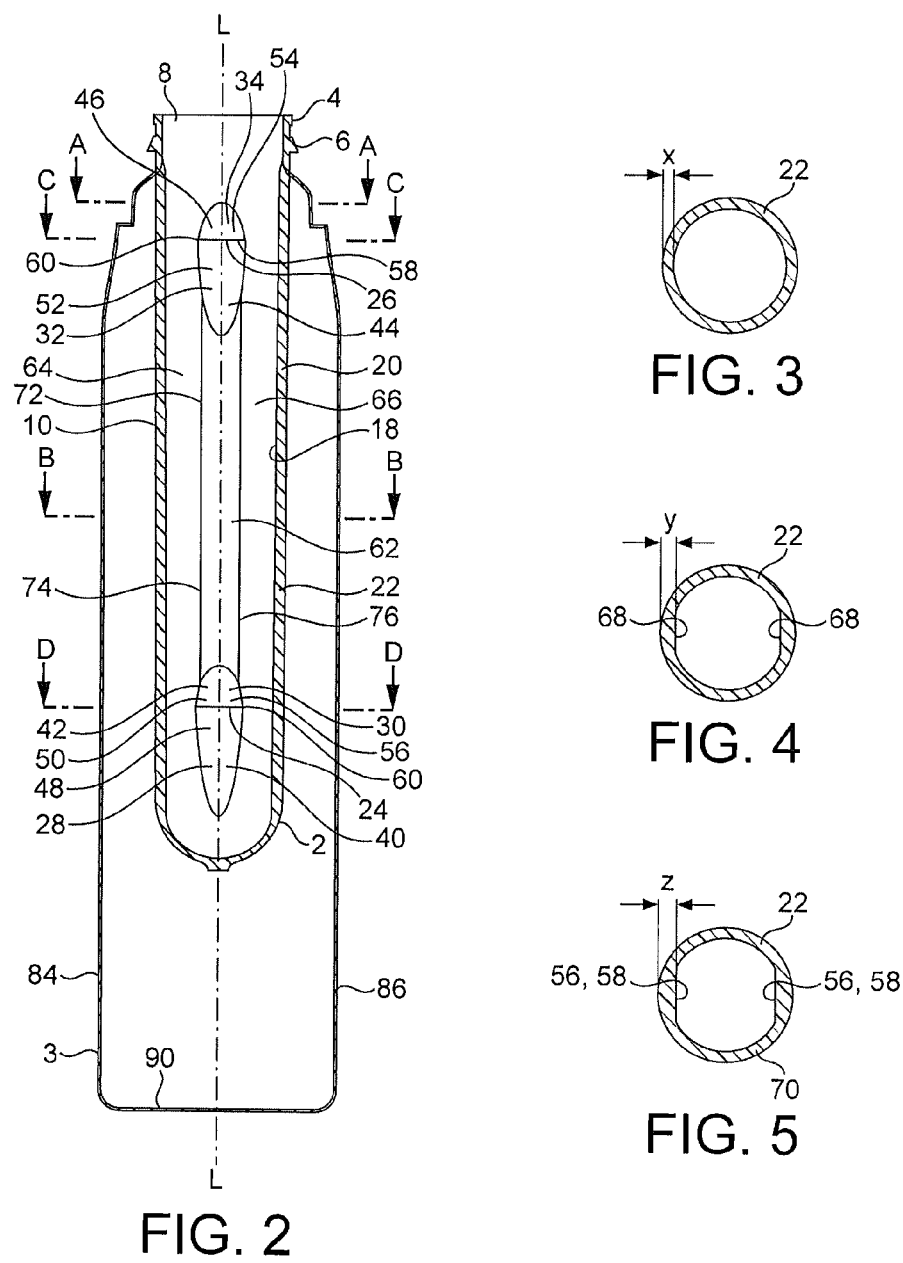

PREFORMS FOR BLOW MOULDING

The present invention relates to a preform, in particular an elongate preform for blow moulding into a container such as a bottle.

In the packaging industry, the process of blow moulding is often used in the manufacture of containers, particularly bottles, for example for carbonated beverages. This process involves the initial formation of a preform, typically by injection moulding, which preforms are subsequently blow moulded to form the containers. Such preforms are typically formed of thermoplastic material, particularly polyethylene terephthalate (PET).

In the conventional blow-moulding process, the preform is blow moulded from its original shape, i.e. the shape imparted to it during the injection moulding process. Conventional blow-moulding involves the step of heating the preform prior to inserting the heated preform into a blow moulding machine. In the blow moulding machine, air is blown into the preform to stretch the preform outwardly so that the container thereby formed assumes a shape defined by a hollow blow moulding cavity.

Some blow moulded containers require shapes which are not rotationally symmetrical, for example the cross-section of a bottle may be oval rather than circular. In order to attempt to maintain uniform material properties, for example biaxial orientation, and uniform sidewall thickness, it is known to provide a preform which has a non-uniform distribution of material around its circumference which reflects the non-uniform shape of the intended blow-moulded container. For example, regions of the preform which are to be highly stretched, causing a high degree of thinning of the sidewall thickness during blow moulding, are provided with an initial higher wall thickness as compared to regions which are to be less stretched.

The conventional process for producing a preform is an injection moulding process. The elongate preform is injection moulded around an elongate core, which may be water cooled, which has external shape and dimensions which define the internal surface of the preform. The core comprises a male mould element having a convex moulding surface.

The external surface of the preform is moulded by a complementary female mould element constituted by a mould block, which may comprise two mating mould halves, having an elongate cavity which defines an elongate concave moulding surface.

When a preform which has a non-uniform distribution of material around its circumference is required to be manufactured, it is conventional to machine the convex surface of the male mould element to have a rotationally non-uniform surface. The result is that the internal surface of the elongate preform, which is moulded by the core, has a rotationally non-uniform surface. This is because machining an elongate convex surface to introduce such non-uniformity is technically simpler and less costly than machining an elongate concave surface. The less expensive core of the injection moulding machine can readily be swapped for another of different dimensions or shape depending on the structure of the selected preform to be injection moulded, while retaining a common more expensive mould block.

The mould block conventionally has a cavity which has a surface of rotation around a central longitudinal axis, and thus the external elongate longitudinally extending surface of the preform has a surface of rotation around a central longitudinal axis. When a preform which has a non-uniform distribution of material around its circumference is manufactured, the core has a non-uniform surface which does not have surface of rotation around a central longitudinal axis and thus the internal elongate longitudinally extending surface of the preform has a non-uniform surface which is not a surface of rotation around a central longitudinal axis.

However, after the preform has been injection moulded from a liquid plastic material solidifying within the mould, it is necessary to remove the preform from the mould. This requires the elongate core preform carrying the solid moulded preform moulded therearound to be remove from the mould block cavity, and then for the solid moulded preform to be longitudinally stripped off the elongate core. In order to ensure that the preform can be easily pulled off the core, and not become stuck on the core, the core progressively decreases in diameter in a longitudinal direction from a fixed end of the core, which is mounted to a support and moulds the open neck of the preform, and a free end of the core which moulds the base-forming portion of the preform. The longitudinal surface of the core along any given longitudinal line has a shallow draft angle, of up to a few degrees, to provide such a diameter decrease. Accordingly, along any given longitudinal line on the core surface extending from the free end to the fixed end, the surface progressively does not decrease in distance from a longitudinal centre line of the core. This ensures that the internal surface of the preform correspondingly, progressing along any given longitudinal line on the internal surface extending from the closed base-forming end to the open neck, does not decrease in distance from a longitudinal centre line of the preform. The internal cavity of the preform, and the external surface of the core which moulds that internal cavity, only progressively increase in a direction from the closed end of the preform to the open end of the preform.

There are a number of disadvantages to the provision of such a conventional structure for a preform for use in a subsequent blow moulding process, most particularly for blow moulding a non-circular container from a rotationally non-uniform preform. In particular, with such a structure it can be difficult to accurately control the material distribution within the blow-moulded container, or the stretch ratio in the various regions of the container having dimensional anisotropy, since the container has a shape which is not a surface of rotation. Some regions may be excessively stretched, leading to undesired high stretch ratios and excessive wall thinning. Furthermore, this can lead to corners of the container, such as a bottle, having undesired thickness, or even undesired thinness. Also, it is generally necessary to provide excess plastic material in the preform to ensure that at least the thinner preform regions are blow moulded into the desired container portions. This increases preform weight, and therefore container weight, and material cost.

The present invention aims to at least partially to overcome these problems of known preforms for blow moulding containers having a rotationally non-uniform shape, i.e. the containers do not have a sidewall which is a surface of rotation. There is therefore currently a need in the art for a preform structure which can improve the material distribution in such stretch blow-moulded containers.

The present invention provides a preform for blow moulding to form a container, the preform being formed of a thermoplastic material, the preform comprising a neck finish at an open end of the preform, an elongate body section and a closed end, wherein the body section has elongate, longitudinally extending inner and outer surfaces each centered about a longitudinal axis of the preform, the inner and outer surfaces defining therebetween a wall of the body section, wherein the wall of the body section has at least one locally thickened portion along the body section, the locally thickened portion being thicker than adjacent first and second thinner portions at respective opposite longitudinal ends of the thickened portion, the thickened portion having an inner surface portion which is nearer to the longitudinal axis than respective first and second inner surface portions of the first and second thinner portions.

Optionally, the wall thickness changes between the locally thickened portion and the adjacent first and second thinner portions are smoothly continuously inclined in the longitudinal direction.

Optionally, the preform comprises first and second inclined inner faces, each at a respective first and second blend angle, relative to the longitudinal axis, for the respective first and second inner surface portions extending away from the locally thickened portion. Further optionally, the first and second inclined inner faces are respectively oriented towards the open end and the closed end, and the first blend angle is smaller than the second blend angle.

Optionally, the locally thickened portion defines a ridge on the inner surface. Further optionally, the ridge is linear and extends orthogonally to the longitudinal axis. Still further optionally, the ridge extends along an angular segment of less than 90° of the inner surface.

Optionally, at least one of the first and second thinner portions comprises a part of a longitudinally extending thickened element which, along its length, is thicker than laterally adjacent regions of the wall on respective opposite lateral sides of the element. Further optionally, the element comprises a radially inwardly directed angular segment.

Optionally, at least a part of the longitudinally extending thickened element has a planar chordal inner surface.

Optionally, the preform comprises two locally thickened portions, each provided at a respective one of two longitudinally spaced locations along the body section. Further optionally, a first locally thickened portion is located at a lowermost third of the length of the body section adjacent to the closed end and a second locally thickened portion is located at an uppermost third of the length of the body section adjacent to the open end.

Optionally, the body section is longitudinally symmetrical and has a plurality of locally thickened portions annularly disposed around the preform.

Optionally, the elongate, longitudinally extending inner surface has an n-fold longitudinal axis of symmetry, where n is at least 2. Typically, n is 2, 3, 4, 5 or 6, or any larger number.

Optionally, the body section has a plurality of locally thickened portions alternating around the circumference of the preform with portions of constant thickness. Further optionally, the portions of constant thickness extend for substantially the entire length of the body section. Yet further optionally, the portions of constant thickness have outer and inner surfaces which extend substantially parallel to the longitudinal axis, optionally with a draft angle of less than 1° extending from the closed end to the open end.

Optionally, along at least one angular segment of the body section there is provided, in a direction from the open end to the closed end, a thickening compared to laterally adjacent regions on respective opposite lateral sides of the thickening, the thickening comprising a first ramp section of increasing wall thickness, a second ramp section of decreasing wall thickness, an elongate constant thickness section, a third ramp section of increasing wall thickness and a fourth ramp section of decreasing wall thickness.

Optionally, the first and second ramp sections define a first transverse ridge therebetween which is closer to the longitudinal axis than the first and second ramp sections.

Optionally, the third and fourth ramp sections define a second transverse ridge therebetween which is closer to the longitudinal axis than the third and fourth ramp sections.

Optionally, the elongate constant thickness section has opposed linear longitudinally extending edges.

Optionally, a respective thickening is provided along each of two opposed angular segments of the body section.

Optionally, the elongate, longitudinally extending outer surface has a circular cross-section.

Optionally, the elongate, longitudinally extending outer surface is substantially right cylindrical, optionally with a draft angle of less than 1° extending from the closed end to the open end.

The present invention further provides a mould part for forming a preform according to the present invention, the mould part comprising a central elongate core having an outer surface corresponding to the inner surface of the preform.

The mould part may be adapted for use in an injection mould or an extrusion compression mould.

The present invention further provides an elongate core of an injection mould or an extrusion compression mould for forming a moulded preform of a thermoplastic material for stretch blow moulding to form a container, the core comprising a fixed end, an elongate body and a free end, the elongate body defining a convex elongate, longitudinally extending moulding surface for moulding an internal surface of a body section of the preform, the first moulding surface having a cross-section centered about a longitudinal axis, and being substantially cylindrical with an acute draft angle to provide that the free end has a smaller diameter than that of the fixed end, the moulding surface including at least one concave undercut where the core is machined below the draft angle of the core.

The core may be a movable core as disclosed, for example, in the present inventor's earlier WO-A-2008/084230 and WO-A-2009/044142.

The present invention further provides a method for blow moulding a preform according to the present invention to form a container having a non-circular cross-section including first opposed faces separated by a major internal dimension and second opposed faces separated by a minor internal dimension, said method including the step of:

a. rotationally orienting the preform in a blow moulding apparatus so that the at least one locally thickened portion is oriented towards moulding surface for moulding a first opposed face.

The present invention is predicated on the finding by the present inventor that by providing the preform inner surface with one or more regions which are located inwardly towards the central longitudinal axis of the preform that adjacent regions which are nearer to the closed base-forming end of the preform, the minimum additional thermoplastic material can be employed to strengthen particular regions of the bottle blown from the preform. This leads to strengthened bottles, particularly non-circular bottles such as oval or rectangular cross-section bottles, which yet have minimum weight, with consequential material and cost savings.

Such an inner surface structure for the preform is achieved by sculpturing the elongate core on which the preform is moulded from liquid thermoplastic material, the core defining the cavity within the preform and the outer surface of the core corresponding to the inner surface of the preform. The sculpturing of the outer surface of the core includes undercutting the core surface, so as to provide a concave undercut where the core is machined below the draft angle of the core.

Undercutting the core would be regarded by the person skilled in the art as illogical if one assumes that the preform is cold, and so the thermoplastic material is substantially rigid, when the preform is stripped off the core, since in such a condition the undercuts would cause very high stripping loads, therefore causing high stress in the preform, which is undesirable.

However, the present inventor has found that in practice, a high percentage of the preform cooling is achieved after stripping of the preform from the core, for example when the preform is held in a take-out robot. This means that the thermoplastic material of the preform is in a pliable state when stripping occurs, and therefore the preform structure, and in particular the inner surface, can easily accommodate deep undercuts as long as there are gentle ramps to accommodate the undercut depth.

Such a concave undercut causes the moulded preform have a corresponding convexity in the inner surface. The stripping action may deform the convexity so as to tend to flatten it, but the convexity tends also to expand back to the previously moulded configuration when stripped off the core, so as to "bump out" of the undercut.

This means that the convexity formed during the moulding process is present in the final solidified preform, without excess stress being present in the preform.

Undercuts can be applied in areas of the core that relate to the bottom corners of an oval bottle to reduce the problem of over-thinning when the bottle is stretch blown from the preform. Alternatively, the undercut can be applied as a continuous band around the core to create stiffening in an area of transition from a circular or round cross-section to an oval cross-section.

Oval bottles that have a small corner radius and/or a small top shoulder radius benefit from side undercuts near the top and bottom of the core to reinforce these normally thin areas. It is also possible to add undercuts wherever bottle thinning take place, effectively sculpturing the core to minimise preform weight.

Round bottles with a small bottom corner radius benefit from a continuous undercut band near the bottom of the core that is positioned so as to align with the radius to ensure corner strength when stretch blown.

The development work by the present inventor has shown that locally thickening the preform, related to the final position in the bottle, has allowed the achievement of a substantially reduced weight in oval bottles. Undercutting the core creates sufficient local thickening of structural regions of the bottle which are particularly susceptible to weakness due to localized thinning, without over-weighting the bottle.

Embodiments of the present invention will now be described by way of example only with reference to the accompanying drawings, in which:

FIG. 2 is a schematic cross-sectional side view, from a second direction, of the preform of FIG. 1, and also showing a side shape of the bottle shown in FIG. 1;

FIG. 3 is a schematic cross-section on line A-A through the preform of FIG. 1;

FIG. 4 is a schematic cross-section on line B-B through the preform of FIG. 1; and FIG. 5 is a schematic cross-section on lines C-C and D-D through the preform of FIG. 1.

Figure 1:
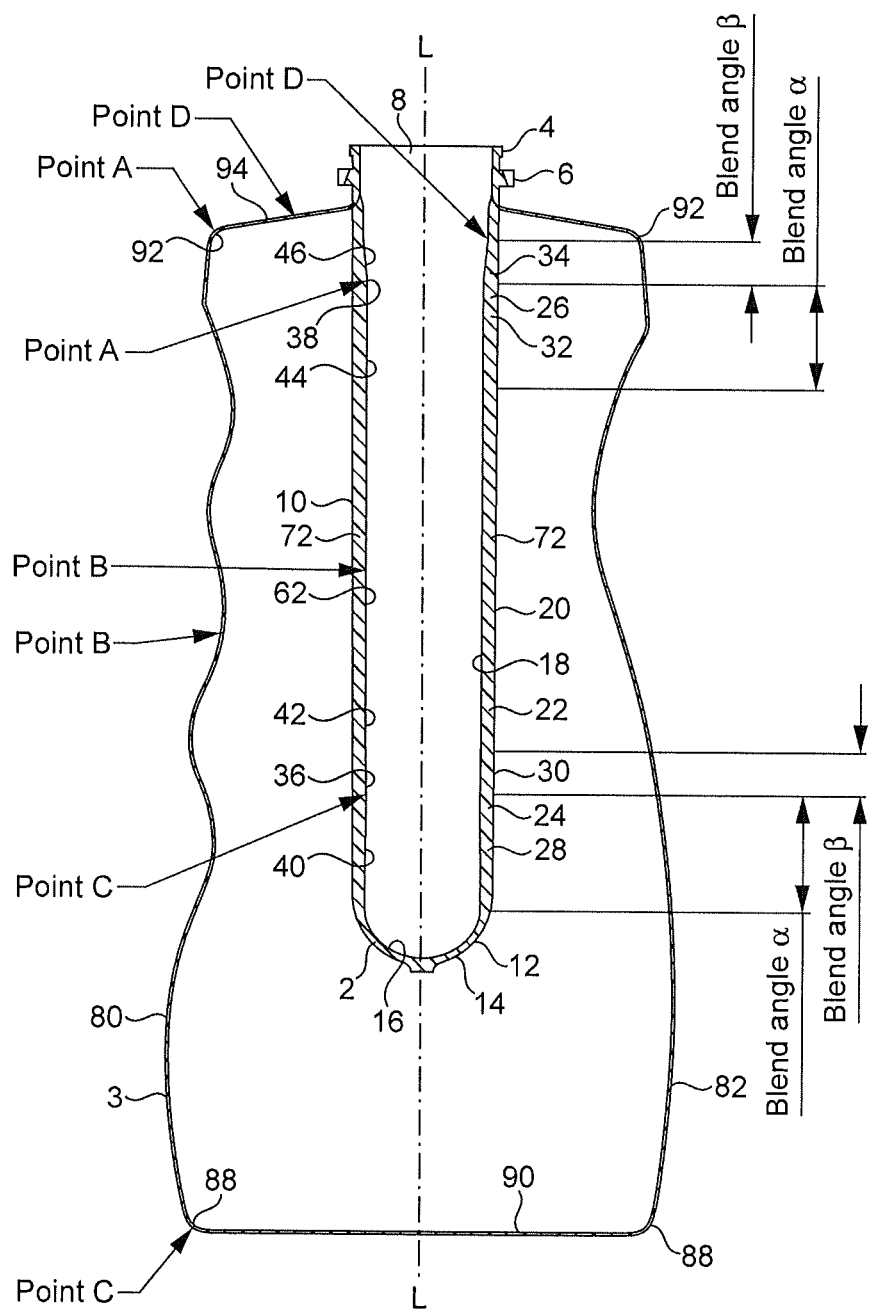
FIG. 1 is a schematic cross-sectional side view, from a first direction, of a preform in accordance with a first embodiment of the present invention, and also showing a front shape of a bottle to be blow-moulded from the preform.

Referring to FIGS. 1 to 5, there is shown a preform 2, for blow moulding a container 3 such as a bottle, in accordance with an embodiment of the present invention, the preform having been formed by an injection moulding process. The preform 2 comprises a thermoplastic material, such as PET. The elongate preform 2 has a conventional hollow structure and comprises a neck finish 4, which may be threaded, including an annular closure seating flange 6, at an open end 8 of the preform 2, a main body section 10 and a closed end 12 having a convex outer surface 14, and a corresponding concave inner surface 16, which are typically substantially hemispherical. The main body section 10 is substantially cylindrical.

The main body section 10 has an elongate, longitudinally extending inner surface 18 and an elongate, longitudinally extending outer surface 20. The outer surface 20 has a circular cross-section, and typically is substantially right cylindrical.

Optionally, the inner surface 18 has a small taper, of a draft angle typically less than 1°, along the entire length or at least towards the closed end 12 to enable the injection moulded preform 2 readily to be removed from the core of the injection mould. Correspondingly, optionally the outer surface 20 has a small taper, of a draft angle typically less than 1°, along the entire length or at least towards the closed end 12 to enable the injection moulded preform readily to be removed from the moulding block of the injection mould.

The inner surface 18 and outer surface 20 are each centered about a longitudinal axis L-L of the preform 2. The inner and outer surfaces 18, 20 define therebetween a wall 22 of the body section 10.

The wall 22 of the body section 10 has at least one locally thickened portion 24, 26 along the body section 10. Each locally thickened portion 24, 26 is thicker than adjacent first and second thinner portions 28, 30; 32, 34 located at respective opposite longitudinal ends of the thickened portion 24, 26. The thickened portion 24, 26 has an inner surface portion 36, 38 which is nearer to the longitudinal axis L-L than respective first and second inner surface portions 40, 42; 44, 46 of the first and second thinner portions 28, 30; 32, 34.

The wall thickness changes between the locally thickened portion 24, 26 and the adjacent first and second thinner portions 28, 30; 32, 34 are smoothly continuously inclined in the longitudinal direction. The preform 2 comprises first and second inclined inner faces 48, 50; 52, 54, each at a respective first and second blend angle α, β, relative to the longitudinal axis L-L, for the respective first and second inner surface portions 40, 42; 44, 46 extending away from the locally thickened portion 24, 26. The first and second inclined inner faces 48, 50; 52, 54, are respectively oriented towards the open end 8 and the closed end 12, and the first blend angle α is smaller than the second blend angle β.

The locally thickened portion 24, 26 defines a ridge 56, 58 on the inner surface 18. The ridge 56, 58 is linear and extends orthogonally to the longitudinal axis L-L, and along an angular segment 60 of less than 90° of the inner surface 18.

The first and second thinner portions 32, 30 comprises a part of a longitudinally extending thickened element 62 which, along its length, is thicker than laterally adjacent regions 64, 66 of the wall 22 on respective opposite lateral sides of the element 62. The element 62 comprises a radially inwardly directed angular segment. At least a part of the element 62 has a planar chordal inner surface 68.

The preform 2 comprises two locally thickened portions 24, 26, each provided at a respective one of two longitudinally spaced locations along the body section 10. A first locally thickened portion 24 is located at a lowermost third of the length of the body section 10 adjacent to the closed end 12 and a second locally thickened portion 26 is located at an uppermost third of the length of the body section 10 adjacent to the open end 8.

The body section 10 is longitudinally symmetrical and has a plurality of locally thickened portions 24, 26 annularly disposed around the preform 2. The inner surface 18 has an n-fold longitudinal axis of symmetry, where n is at least 2, typically 2 as in the illustrated embodiment, for example 2, 3, 4, 5 or 6, or any larger number. The body section 10 has a plurality of locally thickened portions 24, 26 alternating around the circumference of the preform 2 with wall portions 70 of constant thickness. The portions 70 of constant thickness extend for substantially the entire length of the body section 10. The portions 70 of constant thickness have outer and inner surfaces 18, 20 which extend substantially parallel to the longitudinal axis, optionally with a draft angle of less than 1° extending from the closed end 12 to the open end 8.

Along at least one angular segment of the body section 10 there is provided, in a direction from the closed end 12 to the open end 8, a thickening 72 compared to the laterally adjacent regions 64, 66 on respective opposite lateral sides of the thickening 72.

The thickening comprises a first ramp section of increasing wall thickness, for example formed of first thinner portion 28; a second ramp section of decreasing wall thickness, for example formed of second thinner portion 30; an elongate constant thickness section, for example formed of longitudinally extending thickened element 62; a third ramp section of increasing wall thickness, for example formed of first thinner portion 32; and a fourth ramp section of decreasing wall thickness, for example formed of second thinner portion 30.

The first and second ramp sections 28, 30 define a first transverse ridge 56 therebetween which is closer to the longitudinal axis than the first and second ramp sections 28, 30. The third and fourth ramp sections 32, 34 define a second transverse ridge 58 therebetween which is closer to the longitudinal axis than the third and fourth ramp sections 32, 34. The elongate constant thickness section 62 has opposed linear longitudinally extending edges 74, 76. As shown in the illustrated embodiment, a respective thickening 72 is provided along each of two opposed angular segments of the body section. The wall thickness changes provided by the ramp sections are smooth so as to avoid any stress concentrations in the preform 2 or the resultant blow moulded container 3.

FIG. 3 is a schematic cross-section on line A-A through the preform 2, and in the illustrated embodiment the constant wall thickness x at that point (Point D) is 2.0 mm. FIG. 4 is a schematic cross-section on line B-B through the preform 2, and in the illustrated embodiment the opposed elongate constant thickness sections 62 have a maximum wall thickness y of 2.5 mm, alternating with the constant wall thickness x of 2.0 mm, this structure being at Point D. FIG. 5 is a schematic cross-section on lines C-C and D-D through the preform 2, and in the illustrated embodiment the opposed ridges 56. 58 have a maximum wall thickness z of 3.0 mm, alternating with the constant wall thickness x of 2.0 mm, this structure being at Points A and C.

The thickening 72 typically extends for substantially the entire length, parallel to axis L-L, of the main body section 10. However, depending upon the shape and configuration of the desired blow moulded container to be made from the preform 2, the thickening 72 may alternatively extend for only a proportion, even a minor proportion (i.e. less than 50%), of the length of the main body section 10.

In alternative embodiments, the n-fold axis of symmetry for the thickenings 72 may have a different value, for example 3 for making a container having a substantially triangular cross-section, or 8 or greater for making a multi-faceted container.

In the stretch blow moulding step, the preform illustrated in FIGS. 1 to 5 is heated and inserted into a stretch blow moulding apparatus, and is stretch blow moulded from the substantially tubular shape to the shape desired for the final container 3 As shown in FIGS. 1 and 2, the present invention has particular application in a method for blow moulding a preform 2 to form a container 3 having a non-circular cross-section including first opposed faces 80, 82 separated by a major internal dimension and second opposed faces 84, 86 separated by a minor internal dimension In such a method, the preform 2 is rotationally oriented in a blow moulding apparatus so that the at least one locally thickened portion 24, 26, or the thickening 72, is oriented towards a moulding surface for moulding such a first opposed face 80, 82.

Points A, B, C and D indicated for the preform 2 correlate to Points A, B, C and D indicated for the container 3 stretch blow-moulded therefrom.

As shown in FIGS. 1 and 2, the locally thickened portions 24, 26, or thickenings 72, are rotationally oriented so that each lower ridge 56 substantially forms a respective bottom corner 88 of the container 3 which is located between the container base 90 and the respective first opposed faces 80, 82. In the illustrated embodiment, the stretch ratio of the thermoplastic material forming that bottom corner 88 is higher than for any other portion of the container 3, and so the thickened preform material at the ridge 56 prevents over-thinning at that corner 88. Similarly, each upper ridge 58 substantially forms a respective upper corner 92 of the container 3 which is located between the container shoulder 94 and the respective first opposed faces 80, 82. The first opposed faces 80, 82 are substantially formed from the central portion of the thickening 72 between the ridges 56, 58, in particular the second ramp section formed of second thinner portion 30; the elongate constant thickness section formed of longitudinally extending thickened element 62; and the third ramp section formed of first thinner portion 32.

The relatively thickened wall portions of the preform 2 may be preferentially stretched, by having a higher radial stretch ratio, as compared to the relatively thinned wall portions, to provide a substantially uniform sidewall thickness in the resultant non-circular container 3. Even in highly stretched regions of the sidewall, the desired minimum wall thickness has been maintained because these regions are formed from the relatively thickened wall portions of the preform 2.

The shaping of the preform according to the invention may be regarded as an "ovalisation" of the preform where there are vertical areas on the inner surface that are thickened to help maintain wall thickness in the highly stretched areas of the bottle. These thickened areas may be considered to constitute a plurality of integral longitudinal thickened ribs disposed in a mutually spaced configuration around the circular inner surface. Typically this means two sides of a preform being thicker than the other two sides as shown in FIGS. 1 and 2. Such an "ovalisation" structure is achieved by undercutting the core, which minimizes excess material while providing additional material precisely where it is required in the container and particularly at highly stretched corners of container faces remote from the longitudinal axis.

The invention also provides an injection mould or an extrusion compression mould for forming a preform according to the present invention. The injection mould comprises a central elongate core and a mould block defining a cavity for receiving the core. The central elongate core has an outer surface corresponding to the inner surface of the preform. The core includes a convex elongate, longitudinally extending first moulding surface for moulding an internal surface of a body section of the preform, the first moulding surface having a cross-section centered about a longitudinal axis. The cavity includes a concave elongate, longitudinally extending second moulding surface for moulding an external surface of the body section of the preform, the second moulding surface having a circular cross-section centered about the longitudinal axis. In this way, the mould can readily injection mould the preform.

In particular, the elongate core may be of an injection mould or an extrusion compression mould for forming a moulded preform of a thermoplastic material for stretch blow moulding to form a container. The core comprises a fixed end, an elongate body and free end, the elongate body defining a convex elongate, longitudinally extending moulding surface for moulding an internal surface of a body section of the preform, the first moulding surface having a cross-section centered about a longitudinal axis, and being substantially cylindrical with an acute draft angle to provide that the free end has a smaller diameter than that of the fixed end, the moulding surface including at least one concave undercut where the core is machined below the draft angle of the core The present invention also provides a method for blow moulding a preform according to the present invention, to form a container. In particular, the container has a non-circular cross-section including first opposed faces separated by a major internal dimension and second opposed faces separated by a minor internal dimension. The method includes the step of rotationally orienting the preform in a blow moulding apparatus so that the at least one locally thickened portion is oriented towards moulding surface for moulding a first opposed face.

Although various embodiments of the invention have been described in detail, it will be apparent to those skilled in the art that other modifications of the apparatus and methods may be employed that are within the scope of the invention as defined in the appended claims.

The invention claimed is:

1. A preform for blow moulding to form a container, the preform being formed of a thermoplastic material, the preform comprising a neck finish at an open end of the preform, an elongate body section and a closed end, wherein the body section has elongate, longitudinally extending inner and outer surfaces each centered about a longitudinal axis of the preform, the inner and outer surfaces defining therebetween a wall of the body section, wherein the wall of the body section has two locally thickened portions along the body section, each locally thickened portion being provided at a respective one of two longitudinally spaced locations along the body section, wherein a first locally thickened portion is located at a lowermost third of the length of the body section adjacent to the closed end and a second locally thickened portion is located at an uppermost third of the length of the body section adjacent to the open end, each locally thickened portion being thicker than adjacent first and second thinner portions at respective opposite longitudinal ends of the respective thickened portion, each thickened portion having an inner surface portion which is nearer to the longitudinal axis than respective first and second inner surface portions of the first and second thinner portions, wherein the wall thickness changes between the locally thickened portion and the adjacent first and second thinner portions are smoothly continuously inclined in the longitudinal direction, with first and second inclined inner faces, each at a respective first and second blend angle, relative to the longitudinal axis, for the respective first and second inner surface portions extending away from the locally thickened portion, wherein each locally thickened portion defines a ridge on the inner surface, wherein the ridge is linear and extends orthogonally to the longitudinal axis along an angular segment of less than 90° of the inner surface, and wherein at least one of the first and second thinner portions adjacent to each locally thickened portion comprises a part of a longitudinally extending thickened element which extends between the two locally thickened portions and, along its length, is thicker than laterally adjacent regions of the wall on respective opposite lateral sides of the element, and wherein the element comprises a radially inwardly directed angular segment and at least a part of the longitudinally extending thickened element has a planar chordal inner surface.

2. A preform according to claim 1 wherein the first and second inclined inner faces are respectively oriented towards the open end and the closed end, and the first blend angle is smaller than the second blend angle.

3. A preform according to claim 1 wherein the body section is longitudinally symmetrical and has a plurality of locally thickened portions annularly disposed around the preform.

4. A preform according to claim 1 wherein the elongate, longitudinally extending inner surface has an n-fold longitudinal axis of symmetry, where n is at least 2.

5. A preform according to claim 4 where n is 2, 3, 4, 5 or 6.

6. A preform according to claim 1 wherein the body section has a plurality of locally thickened portions alternating around the circumference of the preform with portions of constant thickness.

7. A preform according to claim 6 wherein the portions of constant thickness extend for substantially the entire length of the body section.

8. A preform according to claim 7 wherein the portions of constant thickness have outer and inner surfaces which extend substantially parallel to the longitudinal axis, with a draft angle of less than 1° . extending from the closed end to the open end.

9. A preform according to claim 1 wherein along at least one angular segment of the body section there is provided, in a direction from the open end to the closed end, a thickening compared to laterally adjacent regions on respective opposite lateral sides of the thickening, the thickening comprising a first ramp section of increasing wall thickness, a second ramp section of decreasing wall thickness, an elongate constant thickness section, a third ramp section of increasing wall thickness and a fourth ramp section of decreasing wall thickness.

10. A preform according to claim 9 wherein the first and second ramp sections define a first transverse ridge therebetween which is closer to the longitudinal axis than the first and second ramp sections.

11. A preform according to claim 9 wherein the third and fourth ramp sections define a second transverse ridge therebetween which is closer to the longitudinal axis than the third and fourth ramp sections.

12. A preform according to claim 9 wherein the elongate constant thickness section has opposed linear longitudinally extending edges.

13. A preform according to claim 9 wherein a respective thickening is provided along each of two opposed angular segments of the body section.

14. A preform according to claim 1 wherein the elongate, longitudinally extending outer surface has a circular cross-section.

15. A preform according to claim 14 wherein the elongate, longitudinally extending outer surface is substantially right cylindrical, optionally with a draft angle of less than 1° extending from the closed end to the open end.

16. A method of forming a preform according to claim 1, the method including providing a mould part comprising a central elongate core having an outer surface corresponding to the inner surface of the preform.

17. A method according to claim 16 which is an injection molding method or an extrusion compression molding method.

18. A method according to claim 12 wherein the elongate core comprises a fixed end, an elongate body and a free end, the elongate body defining a convex elongate, longitudinally extending moulding surface for moulding an internal surface of a body section of the preform, the first moulding surface having a cross-section centered about a longitudinal axis, and being substantially cylindrical with an acute draft angle to provide that the free end has a smaller diameter than that of the fixed end, the moulding surface including at least one concave undercut where the core is machined below the draft angle of the core.

19. A method of stretch blow moulding a preform according to claim 1 to form a container having a non-circular cross-section including first opposed faces separated by a major internal dimension and second opposed faces separated by a minor internal dimension, said method including the step of:
   a. rotationally orienting the preform in a blow moulding apparatus so that the at least one locally thickened portion is oriented towards a moulding surface for moulding a first opposed face.

* * * * *